Dec. 17, 1968 D. M. HARVEY 3,416,424
APPARATUS FOR SHUTTER ENERGIZATION AND FILM ADVANCE IN CAMERAS
Filed Aug. 16, 1965 2 Sheets-Sheet 1
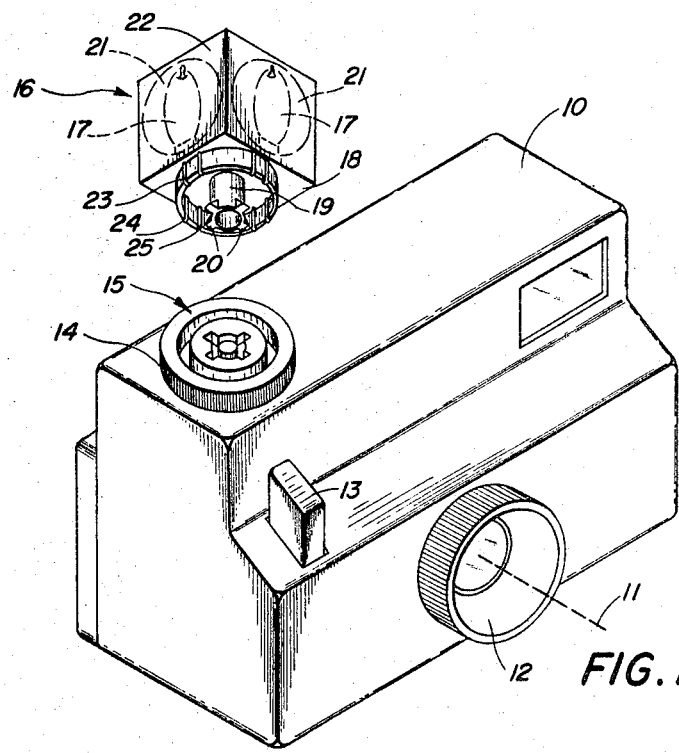
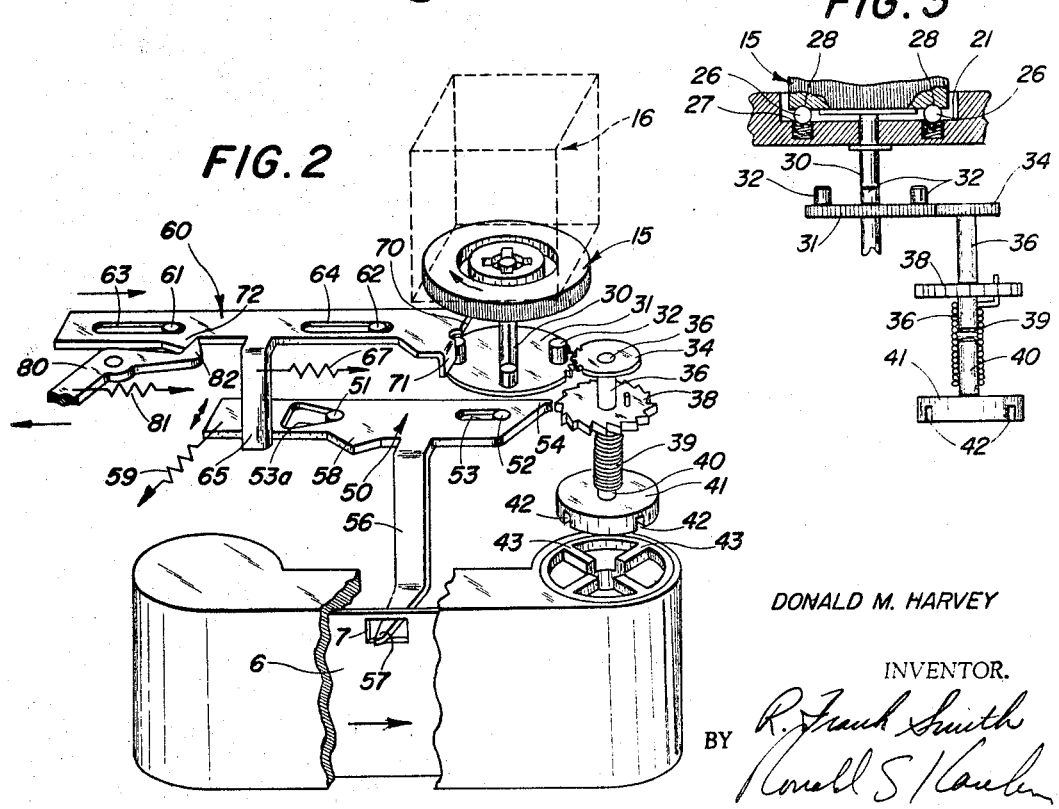
DONALD M. HARVEY
INVENTOR.
BY R. Frank Smith
Ronald S. Kaulen
ATTORNEYS

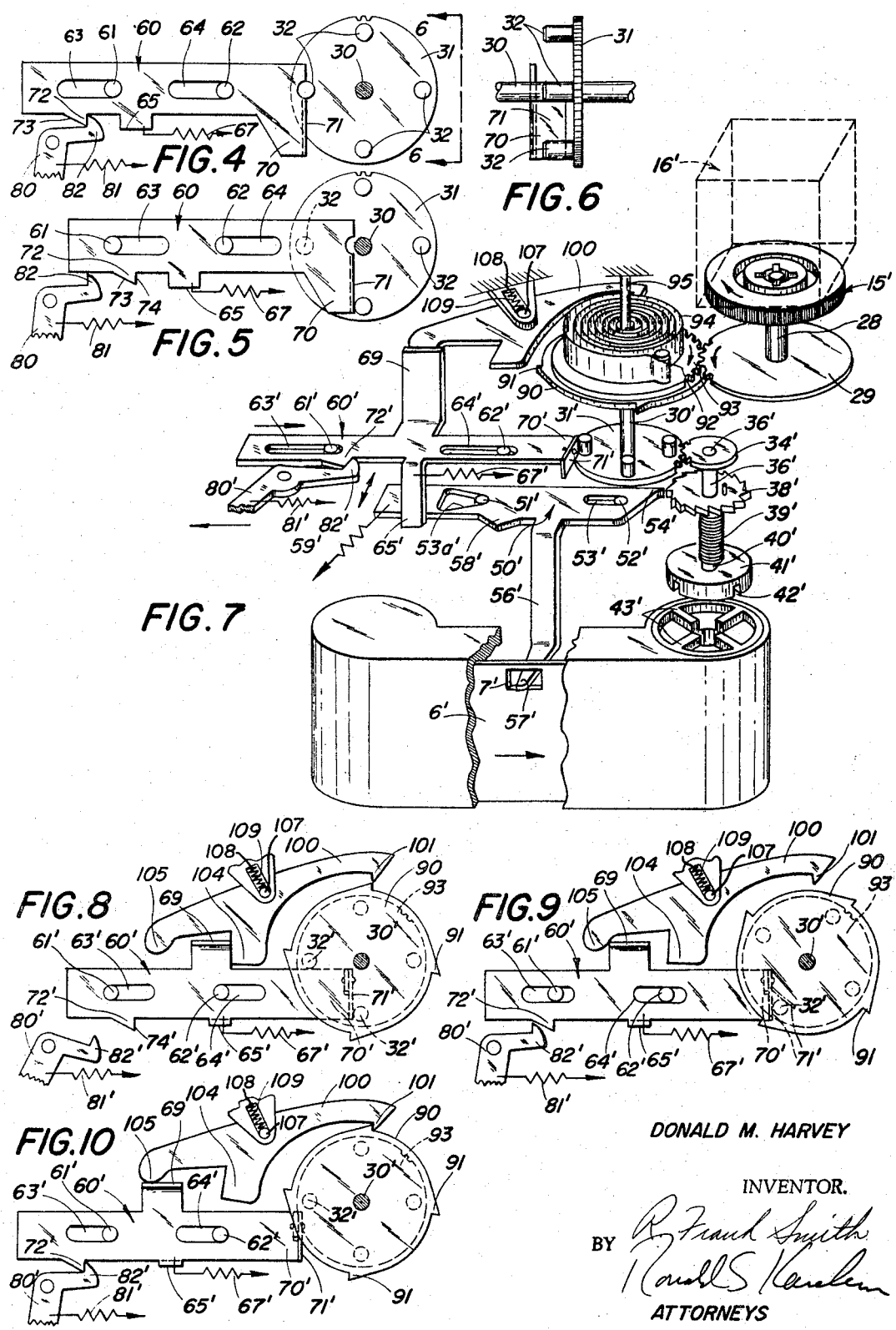

3,416,424
APPARATUS FOR SHUTTER ENERGIZATION AND FILM ADVANCE IN CAMERAS
Donald M. Harvey, Rochester, N.Y., assignor to Eastman Kodak Company, Rochester, N.Y., a corporation of New Jersey
Filed Aug. 16, 1965, Ser. No. 479,742
13 Claims. (Cl. 95—31)

ABSTRACT OF THE DISCLOSURE

A device for relating the rotary movement of a multiple flash unit to other sequential mechanical operations of the camera. Manual rotation of a multiple flash unit is utilized to advance the film and/or to re-energize a shutter actuating device. A common motor can also be used to rotate the flash unit, re-energize the shutter actuating mechanism and advance the film.

---

The present invention relates to photographic still cameras having a built-in flash system for receiving a unitary package containing a plurality of photoflash lamps and individual reflectors. In cameras having such multiple lamp flash systems it is necessary to provide some means for rotating unused lamps into proper position.

According to the present invention, a device is provided for relating the rotary movement of such a multiple flash unit to other sequential mechanical operations of the camera. In particular, one aspect of this invention concerns a mechanism whereby the movement imparted during manual rotation of a multiple flash unit can be utilized to advance the film and/or to re-energize a shutter actuating device. By another aspect of this invention, a mechanism is provided whereby rotation of the flash unit, re-energization of the shutter acuating mechanism and the film advance can be automatically effected by a common motor means.

There has been developed a unitary, disposable, multi-lamp photoflash package, as disclosed, for example, in applications for U.S. Letters Patent of Franklin D. Kottler et al. Ser. No. 417,914, and Dean M. Peterson et al., Ser. No. 417,913 both filed Dec. 14, 1964, and now Patent Nos. 3,327,105 and 3,353,465, respectively. In addition, a mechanism has been developed for receiving such a package to successively place unused photoflash lamps of the package in a camera photoflash circuit to augment scene light in timed relation with camera operation, as disclosed, for example, in application for U.S. Letters Patent, David E. Beach, Ser. No. 458,016, filed May 24, 1965, now Patent No. 3,353,468.

Likewise, various automatic or motor driven film advancing means have been developed for still cameras, as for example the spring motor drive disclosed in application for U.S. Letters Patent of David E. Beach, Ser. No. 260,628, filed Feb. 25, 1963, now Patent No. 3,186,322.

It is, therefore, an object of this invention to provide a mechanism which connects the multi-flash unit to the film advance mechanism of the camera so that the manual rotation of the flash unit will effect advancement of the roll film for the next exposure.

It is another object of this invention to provide mechanism whereby the rotation of the flash unit will effect an energization or cocking of the shutter actuating mechanism in the camera.

It is further an object of this invention to provide a mechanism by which the manual positioning of the flash unit will effect both the aforementioned film advance and cocking.

Another object in accordance with the present invention is to provide mechanism whereby a common automatic drive means can be utilized to rotate the multi-flash unit and to effect the aforementioned film advance and/or cocking of the shutter actuating mechanism.

Other objects of this invention will be apparent from the description and drawings which follow and wherein:

FIG. 1 is a front perspective view of the camera and flash unit according to an embodiment of this invention adapted for manual positioning of the flash unit.

FIG. 2 is an exploded perspective view of the manually operated embodiment of FIG. 1 showing the flash unit, film rolls and the mechanism according to this invention for film advancement and energization of the shutter actuating device.

FIG. 3 is a fragmentary sectional view showing the film advancing gear train and spring clutch.

FIGS. 4 and 5 are top views of the shutter actuating device respectively showing the mechanism in the energized and de-energized positions.

FIG. 6 is a perspective view of the shutter actuating mechanism, as viewed from line 6—6 of FIG. 4.

FIG. 7 is an exploded perspective view of another embodiment of this invention wherein a spring motor means is utilized to rotate the flash unit to the proper position and to effect film advance and energization of the shutter actuating mechanism.

FIGS. 8-10 are top views of the spring motor driven unit of FIG. 7 illustrating various sequential positions of the mechanism.

Referring to FIG. 1, a camera embodying the present invention is shown comprising a light-tight housing 10 in which roll film is exposed by successively positioning frame portions of the film on the film plane of the picture-taking axis 11. Exposure is made through a light aperture on axis 11 by focusing the image of a scene on the film plane through an objective lens 12 for a predetermined time peiod. Operation of the camera is accomplished by operating the arm 13 which functions to release the shutter actuating mechanism, hereinafter described, and thereby operate the shutter.

On the top wall of housing 10 is located a socket assembly 15 for receiving a multilamp photoflash package 16 and positioning one of plurality of flash lamps 17 so as to face forwardly in the direction of the picture taking axis 11.

The multilamp package or unit 16, as is more fully described in the applications referred to above, comprises a plurality (four) of miniature photoflash lamps 17 of known manufacture (AG variety) ordinately mounted on a rotable base 18 about a vertical axis of rotation defined by a depending center post 19. The center post 19 has a hollow cylindrical shape and includes four radially extending lugs 20 having upper and lower ramped surfaces engageable with retaining means in a receiving socket arrangement.

The base 18 defines four lamp sides at which the lamps 17 are located, and disposed behind each lamp 17 is a dish-shaped light reflector 21 of preformed sheet material to provide the desired light emission pattern. A light transmitting protective cover 22 of cubic shape is fixed to the base and overlies the lamps 17 and reflectors 21 to enclose the package.

An annular contact ring 23, coaxial with the center post 19, extends below the base 18. Pairs of lead-in wires 24, 25 from each photoflash lamp 17 pass through the base 18 and are wrapped vertically around the contact ring 23 for selective electrical connection by engagement with the terminals of a flash synchronizing circuit to fire the flash lamp in timed relation with camera operation in a known manner.

The socket assembly 15 defines an access opening which permits the insertion of the connecting post 19 and retaining lugs 20 of the multilamp package 16 in any one of four preselected positions and includes an outer portion 14 adapted for manually rotating the assembly 15. The inserted package 16 is releasably retained in the socket assembly 15 in a fixed position relative thereto, by suitable means as disclosed, for example, in the aforementioned U.S. application Ser. No. 458,016. The socket 15 is rigidly connected to the main drive shaft 30 and mounted for rotation in a bearing recess 21 on the top of the camera housing. In the bearing recess 27 at 90° intervals, as can be seen in FIG. 3, are disposed four spring loaded detents 26 which cooperate with corresponding cavities 28 on the bottom surface of the lamp socket 15 to index the flash unit in one of the four positions aligning the flash with the picture taking axis 11.

Referring to FIG. 2 of the drawings, it can be seen that the retaining socket 15 is connected to the top of the main drive shaft 30 so as to transmit the manual rotative movement of the flash unit 16 to the shaft 30.

The end of the main drive shaft 30 opposite the retaining socket 15 is rigidly connected to a main drive gear 31 so as to transmit rotary motion of the flash unit 16 to the gear 31. Four cocking pins 32 extend from the upper surface of the main drive gear 31 and are disposed around the periphery of the gear at 90° intervals corresponding to the four aligned positions of the flash socket 15.

Engaging the main drive gear 31, as best seen in FIGS. 2 and 3, is a film advance gear 34 which is rigidly attached to and supported for rotation by the idler-advance shaft 36. The idler advance shaft 36 is journaled in the camera top (not shown), or otherwise rotatably fixed to the camera housing 10. Rotatably mounted on idler-advance shaft 36 and displaced below the film advance gear 34 is an advance control ratchet 38. Attached to the lower surface of the advance control ratchet 38 and extending around the lower portion of the idler-advance shaft 36 is a conventional spring clutch 39. The spring clutch 39 extends beyond the lower end of shaft 36 and engageably joins shaft 36 to a film advance shaft 40. Rigidly attached to the lower end of the film advance shaft 40 is a roll engaging disc 41 having therein grooves 42 which cooperate with corresponding protrusions 43 on the inserted film take-up roll so as to engage the roll in a conventional manner.

Slideably mounted within the camera body on pins 51, 52 and adapted for movement in a horizontal plane is a film advance control lever 50, as best seen in FIG. 2. The control lever 50 is spaced from and located in the same plane as the advance control ratchet 38 and has two mounting slots 53, 53a which loosely fit around pins 51 and 52 so as to allow limited movement of the lever 50 in the horizontal plane. The control lever 50 further comprises an advance control pawl 54 which is adapted to engage the control ratchet 38, an advance control claw 56 and a release cam 58.

The advance control claw 56 extends outwardly from and below the main portion of the control lever 50 and has a film engaging spur 57 which is positioned adjacent the film in the manner shown in FIG. 2.

The control lever 50 is biased in a direction away from the advance control ratchet 38 and towards the film strip 6 by a spring 59 attached thereto at the end opposite from the pawl 54.

Mounted above the advance control lever 50 and adapted for a one directional sliding movement in the horizontal plane is a shutter actuating arm 60. Within the main body portion of the actuating arm 60 are two elongated slots 63, 64 which are slideably engaged by mounting pins 61 and 62 so as to support and control the movement of the actuating arm. A cam actuating extension 65 of the operating arm 60 projects below the plane of the main body portion of the actuating arm to a position adjacent the releasing cam 58 of the advance control lever 50.

The edge 70 of the actuating arm is disposed adjacent to and slightly above the main drive gear 31. As seen in FIG. 6, a cocking lip portion 71 of the arm 60 extends below the edge 70 of actuating arm 60 so to engage the cocking pins 32 during rotation of the main drive gear 31. The edge 70 is disposed slightly above cocking pins 32 to provide clearance for the movement of actuating arm 60 when the cocking pins 32 have been rotated to one of the four preselected operating positions.

The actuating arm extension 65 on arm 60 is connected to the shutter actuating spring 67 which is attached to the camera housing so as to urge the actuating arm 60 towards the cocking pins 32, i.e., in a shutter actuating direction.

The actuating arm 60 also comprises a holding lug 72 projecting from the same side as, and disposed slightly further from the end 70 than, the cam actuating extension 65. The holding lug 72 is formed having a camming surface 73 and a holding surface 74 which cooperate with a retaining arm 80 to hold the actuating arm 60 in its energized position as can be seen in FIGS. 4 and 5.

The retaining arm 80 is pivotably attached to the camera housing and urged by retaining spring 81 so as to force the latch portion 82 of the retaining arm against the edge of the actuating arm 60 and the holding lug 72. The operating arm 13 cooperates with retaining arm 80 to effect release of the shutter actuating arm 60. The camming surface 73 of lug 72 pivots the retaining arm 80 against the force of spring 81 to permit cocking movement of the actuating arm.

A conventional shutter mechanism (not shown) is connected to the actuating arm and operated by the actuating arm's movement towards the main drive shaft, i.e., in the de-energized or shutter actuating direction.

In describing the operation of the device disclosed in FIGS. 1–6, it is assumed that the camera is loaded with film, that a multiple flash unit has been placed in the socket 15 and that an exposure has occurred. In this condition, the shutter actuating arm 60 is in a de-energized position such as is shown in FIG. 5, and the film advance control lever 50 has been disengaged from advance control ratchet 38 and the advance control perforation 7 in the film 6.

To prepare the camera for the next exposure, the flash unit 16 and socket 15 are grasped and manually turned 90° in a clockwise direction, as viewed in FIG. 2, and engaged by the detents 26 to align the flash unit 16 for the next exposure.

The rotation of the flash unit is transmitted through the main drive shaft 30 and main drive gear 31 to the film advance gear 34. Rotation of the film advance gear is transmitted through the idler-advance shaft 36 and spring clutch 39 to film advance shaft 40 and roll engaging disc 41 so as to effect advance of the film.

In the event that the appropriate film advance is accomplished prior to the full 90° rotation of the flash unit, as occurs when the take-up roll increases in diameter, the spring clutch 39 disengages the idler-advance shaft 36 from the advance shaft 40. This disengagement is triggered by the advance control perforations 7 which are located on the film 6 at intervals of desired advances. When a control perforation 7 passes beneath the engaging spur 57 of the control lever 50, the spur 57 is moved into the perforation 7 by spring 59 and thereafter engaged and moved in the direction of film advance by the control perforation.

The movement of spur 57 is transmitted through control claw 56 to the control lever 50 which is thereby moved in the general direction of film advance. The movement of the control lever 50 causes the advance control pawl 54 to engage the advance control ratchet 38. Rotation of the control ratchet 38 releases spring clutch 39 and disengages the film advance shaft 40 and the idler-advance shaft 36 so as to terminate the film advance.

As the main drive gear 31 is rotated with the multiple-flash unit 16 and socket 15, the cocking pin 32 which is engaged with the cocking lip 71 of the shutter actuating arm 60, is rotated through a 90° arc and thereby displaces the actuating arm 60 from the de-energized position of FIG. 5 to the energized position shown in FIG. 4. During the cocking movement of the actuating arm 60, the retaining arm 80 is displaced by the camming surface 73 of the holding lug 72 and then returned by spring 81 to engage the holding surface 74 of the lug 72 and retain the arm 60 in the energized position as disclosed in FIG. 4. Upon completion of the 90° rotation the cocking pin 32 is disengaged from the cocking lip portion 71 of the actuating arm and the arm is held in the energized position by the retaining arm 80. At this stage the camera has been prepared for the next exposure solely by rotation of the multiple flash unit.

When the exposure occurs by the operator's release of retaining arm 80, the shutter actuating arm 60 is moved to a de-energized position by spring 67, and the cam actuating extension 65 engages the release cam 58 of the advance control arm 50 so as to disengage the control spur 57 from the control perforation 7. The spring 59 then disengages the control pawl from control ratchet 38 so as to prepare the camera for the next winding sequence.

The modification of the invention shown in FIGS. 7–10 embodies additional structure to that shown in FIGS. 1–6 in order to afford automatic means for rotating the multiple flash unit in addition to accomplishing the function of the previously disclosed device.

As can be seen in FIG. 7, the film advance mechanism of the modified device is identical to that of FIG. 1 from the main drive shaft 30 throughout the film advancing and advance control mechanism. Parts whose function and structure are similar with those of FIGS. 1–6 have been given like numerals in drawings 7–10. The shutter actuating mechanism 60' differs from that of FIG. 1 in that the lip portion 71' is constructed as a separate resilient piece which is attached to the end 70' so as to form a one-way gate for lugs 32' during winding. In addition, a motor control bar 69 is located on the side of the actuating arm opposite the holding lug 72 and which extends vertically upward therefrom.

In the device shown in FIG. 7, a motor control plate 90 is rigidly affixed to the upper end of main drive shaft 30. Extending from the periphery of the motor control plate 90 are four ratchet-type control spurs 91 which are spaced at 90° intervals. Rigidly attached to the motor control plate are a spring winding post 92 and a motor gear 93 such as are illustrated in FIG. 7. A coiled spring motor 94 is located upon the upper surface of the motor gear 93 and attached by the end of the outer coil to the post 92. The inner end of the coil 94 is attached to a post 95 which is fixed to the camera housing 10.

A motor control arm 100 having a ratchet portion 101 is pivotally mounted on pin 107 and located for engagement with the spurs 91 of the motor control plate 90 and the motor control bar 69. Spring 109 mounted in slot 108 urges pivoted arm 100 into contact with control plate 90. The motor control arm 100 further comprises a ratchet release bar 104 and a ratchet engaging lug 105 each extending from the control arm in a horizontal plane so as to engage the motor control bar 69 in one position as illustrated in FIGS. 8 and 10.

A winding gear 29 is supported for engagement with the motor gear 93 by a shaft 28 which is rigidly attached on its upper end to multiple flash socket 15. The socket 15 of the device in FIG. 7 engages the camera housing 10 in the same manner as was disclosed with respect to FIG. 1.

To facilitate the explanation of the operation of the spring motor driven unit of FIG. 7, it is assumed that film has been inserted in the camera and a multiple-flash unit is inserted in the socket 15. If the spring motor 94 is in an unwound condition, the flash unit 16 is grasped and manually rotated in a clockwise direction to effect winding. In the event that the shutter actuating arm 60' is in a de-energized position, the initial winding rotates cocking pins 32' through the one-way gate 71'. Release of the unit 16 will allow the spring motor 94 to rotate the main drive gear 31' in a clockwise direction thus cocking the actuating arm 60'. With the actuating arm 60' in a cocked position, the ratchet engaging lug 105 is contacted by the motor control bar 69 so that the ratchet portion 101 of control arm 100 engages spurs 91 and limits the movement of the control plate 90 in an unwinding or clockwise direction. Winding is subsequently completed with spring 109 yieldably maintaining the ratchet portion 101 in contact with the peripheral edge of control plate 90 so as to allow counter-clockwise, winding rotation and limit rotation in an unwinding or clockwise direction.

After winding the spring motor 94, the camera may be operated by merely releasing the retaining arm 80. The shutter actuating arm then moves in an actuating direction, operating the shutter in a known manner and releasing the advance control arm 50' in the same manner as was previously described with respect to FIG. 1.

However, in this instance, the control bar 69 engages the rachet release bar 104 and pivots the motor control arm 100 so as to release the motor control plate 90. The spring motor 94 now drives the main drive shaft 31 in a clockwise direction and effects the film advance and cocking of the shutter actuating mechanism in the same manner as was described with respect to FIG. 1. Further, the spring motor, through motor gear 93, winding gear 29 and shaft 28, rotates the flash unit 16 90° so as to present an unused lamp on the picture taking axis. In this respect it is pointed out that the re-cocking of the actuating arm 60 moves the control bar 69 back into engagement with the ratchet engaging lug 105 so as to pivot the control arm 100 into the holding position illustrated in FIG. 10 whereby the control rotation is limited to 90° for each shutter actuation.

It is pointed out that various modifications of these devices can be effected within the spirit of the invention disclosed herein, and that the applicant's invention is not therefore limited by the specific examples disclosed. For example, this device could readily be adapted for use with flash units having more than four lamps. Likewise, the unit could be modified so as to synchronously operate only the flash rotation and film advance or flash rotation and shutter re-energization.

I claim:
1. In a roll film camera having a rotatable socket portion to recive and retain a unit containing a plurality of photoflash lamps, a film advance and shutter actuating mechanism comprising:
    (a) main drive means coupled to said socket to be rotated therewith,
    (b) film advancing means engageable with said main drive means for rotation in a film advancing direction,
    (c) shutter actuating means movable to respective energized and de-energized positions and operatively associated with said main drive means,
    (d) said main drive means including means for moving said actuating means to said energized position, whereby rotation of the socket portion effects film advance and energization of the shutter actuating means.

2. A device in accordance with claim 1 further comprising retaining means for holding and releasing said shutter actuating means from said energized position.

3. A device in accordance with claim 1 wherein said film advance means includes drive and control means and means for engaging an inserted film roll, further comprising advance control means engagable with said drive and control means and with the film in said camera for disengaging said drive and control means from said film roll engaging means so as to allow rotation of said socket portion without advance of said film roll.

4. A device in accordance with claim 3 wherein said shutter actuating means further comprises release means in contact with said advance control means for disengaging said advance control means from said drive and control means so as to allow advance of said film.

5. A device in accordance with claim 4 wherein said release means also disengages said advance control means from said film.

6. In combination with a roll film camera having a rotatable socket portion to receive and retain a unit containing a plurality of photoflash lamps, a film advancing mechanism comprising:
   (a) main drive means coupled to said socket and rotatable therewith,
   (b) film advancing means engageable with a received film roll for rotating said roll in a film advancing direction,
   (c) means for coupling said film advancing means and said main drive means so that rotation in a film advancing direction is transmitted to said film advance means from said main drive means, whereby rotation of said socket portion will effect an advance of said film roll.

7. A device in accordance with claim 6 wherein said film advance means includes a drive and control means and means for engaging an inserted film roll, further comprising an advance control means engagable with said drive and control means and with the film in said camera for disengaging said drive and control means from said film roll engaging means so as to allow rotation of said socket portion without advance of said film roll.

8. In combination with a roll film camera having a rotatable socket portion to receive and retain a unit containing a plurality of photoflash lamps, a shutter actuatin mechanism comprising:
   (a) main drive means coupled to said socket and rotatable therewith,
   (b) shutter actuating means which is movable to an energized and de-energized position and is operatively associated with said main drive means.
   (c) said main drive means including means for moving said actuating means to said energized position, whereby rotation of the socket portion will effect energization of said shutter actuating means.

9. A device in accordance with claim 8 further comprising a retaining means for holding and releasing said shutter actuating means from said energized position.

10. In a roll film camera adapted to receive film rolls the combination comprising:
   (a) a rotatable socket adapted to receive and index a unitary package containing a plurality of flash lamps and individual reflectors,
   (b) motor means for imparting rotary movement,
   (c) connecting means for transmitting the movement from said motor means to said socket,
   (d) main drive means connected to said motor means,
   (e) film advancing means engageable with said main drive means for rotation in a film advancing direction,
   (f) shutter actuating means which are movable to an energized and de-energized position and is operatively associated with said main drive means,
   (g) said main drive means including means for moving said shutter actuating means to said energized position, and
   (h) motor control means engagable with said motor means for controlling movement of said motor means.

11. A device in accordance with claim 10 wherein said film advance means includes drive and control means and film roll engaging means, further comprising advance control means engagable with said drive and control means and with the film in said camera for disengaging said drive and control means from said film roll engaging means so as to allow rotation of said socket portion without advance to said film roll.

12. A device in accordance with claim 11 wherein said shutter actuating means further comprises release means in contact with said advance control means for disengaging said advance control means from said drive and control means so as to allow advance of said film.

13. A device in accordance with claim 12 wherein said shutter actuating means further comprises motor operating means which is engageable with said motor control means for positioning said motor control means to control said motor.

References Cited

UNITED STATES PATENTS

| 3,353,467 | 11/1967 | Ernisse et al. | 240—37.1 |
| 3,353,468 | 11/1967 | Beach | 240—37.1 |
| 3,354,300 | 11/1967 | Parsons et al. | 95—11 |

NORTON ANSHER, *Primary Examiner.*

J. F. PETERS, *Assistant Examiner.*

U.S. Cl. X.R.

95—11